US012640060B2

(12) United States Patent
Ueda

(10) Patent No.: US 12,640,060 B2
(45) Date of Patent: May 26, 2026

(54) ARTIFICIAL TISSUE AND MEDICAL TRAINING DEVICE

(71) Applicant: FUJIFILM Corporation, Tokyo (JP)

(72) Inventor: Yoshihiro Ueda, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 481 days.

(21) Appl. No.: 18/304,331

(22) Filed: Apr. 20, 2023

(65) Prior Publication Data

US 2023/0351922 A1 Nov. 2, 2023

Related U.S. Application Data

(60) Provisional application No. 63/335,714, filed on Apr. 27, 2022.

(51) Int. Cl.
*G09B 23/34* (2006.01)
*G09B 23/28* (2006.01)

(52) U.S. Cl.
CPC ............ *G09B 23/34* (2013.01); *G09B 23/285* (2013.01)

(58) Field of Classification Search
CPC ....... G09B 23/34; G09B 23/285; G09B 23/30
USPC .......................................... 606/32
See application file for complete search history.

(56) References Cited

U.S. PATENT DOCUMENTS

| | | | |
|---|---|---|---|
| 2008/0299529 A1 | 12/2008 | Schaller | |
| 2016/0314714 A1* | 10/2016 | Kogiso | A61B 1/00057 |
| 2017/0061830 A1 | 3/2017 | Kogiso | |
| 2018/0075777 A1* | 3/2018 | Iverson | G09B 23/30 |
| 2018/0357930 A1* | 12/2018 | Kuwabara | A61L 27/52 |

FOREIGN PATENT DOCUMENTS

| | | |
|---|---|---|
| JP | 2004049479 | 2/2004 |
| JP | 2009519476 | 5/2009 |
| JP | 2013127496 | 6/2013 |
| JP | 2017107094 | 6/2017 |
| JP | 2019065080 | 4/2019 |
| WO | 2015186623 | 12/2015 |
| WO | 2016002411 | 1/2016 |

* cited by examiner

*Primary Examiner* — Beverly M Flanagan
(74) *Attorney, Agent, or Firm* — JCIPRNET

(57) ABSTRACT

An artificial tissue includes: a first layer that is made of a conductive material and is provided on a front surface side of the artificial tissue, the first layer having a front surface portion and a side surface portion; a second layer that is made of a conductive material and is provided on a back surface side of the first layer, the second layer having a front surface and a side surface; and a support layer that supports the first layer and the second layer from a back surface side of the artificial tissue, in which the front surface portion of the first layer covers the front surface of the second layer, and the side surface portion of the first layer covers the side surface of the second layer.

15 Claims, 8 Drawing Sheets

ARTIFICIAL TISSUE AND MEDICAL TRAINING DEVICE

CROSS-REFERENCE TO RELATED APPLICATIONS

This application is based on and claims priority from U.S. Provisional Application No. 63/335,714 filed on Apr. 27, 2022, the entire disclosure of which is incorporated herein by reference.

BACKGROUND OF THE INVENTION

1. Field of the Invention

The present invention relates to an artificial tissue and a medical training device.

2. Description of the Related Art

JP2017-107094A discloses a model of viscera, tissues, or organs including a foam layer containing a hydrogel, in which the model is a laminate in which another layer is laminated on one surface side of the foam layer, the model is a laminate in which still another layer is laminated on the other surface side of the foam layer, polysaccharides are contained in the foam layer, and the hydrogel is a polyvinyl alcohol gel.

WO2016/002411A discloses a model for an endoscope including a tissue holding portion including a first member that includes a through-hole, is hard, and is formed in a frame shape, and a second member that is formed in a sheet shape with a material that is more flexible than the first member and is elastically deformable, includes a window portion that penetrates the second member in a thickness direction, and is attached to the first member, in which a tissue piece is attached to the second member to overlap the window portion, and the second member is attached to the first member in a state in which the second member is elastically deformed such that tension acts.

WO2015/186623A discloses a model for an endoscope including a basic shape portion formed by imitating a shape of a tubular organ, and a tissue holding portion that is attachably and detachably provided with respect to the basic shape portion, in which the tissue holding portion includes a body that is formed in a cylindrical shape and includes a window portion communicating with an inner space, on an outer peripheral surface, and a fixing member that fixes a tissue piece on the body such that at least a portion of the tissue piece overlaps the window portion, and the body is rotatable in a circumferential direction of the body with respect to the basic shape portion in a state in which the body is attached to the basic shape portion.

JP2013-127496A discloses a simulated organ fixation table including a base consisting of a bottom portion, a first side surface portion installed substantially perpendicular to the bottom portion, and a second side surface portion installed to face the first side surface portion, a first fixing unit that is installed in the bottom portion and fixes an duodenal side end part of a simulated stomach portion formed by imitating a resin material or a silicone material into a shape of a three-dimensional hollow stomach, upward from the bottom portion, a second fixing unit that is installed in the first side surface portion and fixes an esophageal side end part of the simulated stomach portion substantially in parallel to the bottom portion, and a third fixing unit that is disposed on the second side surface portion on the first fixing unit side with respect to the position facing the second fixing unit and fixes one end of a simulated intestinal portion formed by imitating a resin material or a silicone material into a shape of a three-dimensional hollow intestine, substantially in parallel to the bottom portion.

JP2004-049479A discloses a training device for an endoscope, the training device including a pseudo-organ configured by two or more layers.

JP2009-519476A discloses a training model for an endoscopy and treatment of a hollow organ, the training model including a chamber for accommodating the hollow organ and having a chamber wall, at least one inlet for introducing an endoscope into the hollow organ, the inlet being fixed to the chamber wall and having a coupling device to which the hollow organ can be coupled, a connection portion in the chamber wall to which a suction pump for the generation of a negative pressure in the chamber can be connected, and a molding in the chamber having a cavity into which the coupling device opens out, which is adapted to an outer shape of the hollow organ, and into which the hollow organ can be inserted.

JP2019-065080A discloses a model for training a technique of endoscopic dissection using a conductive resin composition.

SUMMARY OF THE INVENTION

The present invention is to provide a new artificial tissue and a medical training device.

An aspect of the technology of the present disclosure relates to an artificial tissue comprising a first layer that is made of a conductive material and is provided on a front surface side of the artificial tissue, the first layer having a front surface portion and a side surface portion, a second layer that is made of a conductive material and is provided on a back surface side of the first layer, the second layer having a front surface and a side surface, and a support layer that supports the first layer and the second layer from a back surface side of the artificial tissue, in which the front surface portion of the first layer covers the front surface of the second layer, and the side surface portion of the first layer covers the side surface of the second layer.

Another aspect of the technology of the present disclosure relates to a medical training device comprising the artificial tissue described above, and a simulated organ to and from which the artificial tissue is attachable and detachable.

According to the present invention, it is possible to provide a new artificial tissue and a medical training device.

DESCRIPTION OF THE PREFERRED EMBODIMENTS

Hereinafter, the description of a training system 100 including a medical training device 50 according to an embodiment of the present invention will be made. An artificial tissue described in the present specification refers to an artificially reproduced part on an inner surface side of an organ (gastrointestinal tract, such as oral cavity, esophagus, stomach, duodenum, rectum, large intestine, and cecum, bronchus, or bronchi) in a human or animal. A simulated organ described in the present specification refers to a model that imitates the organ described above.

Figure 1:
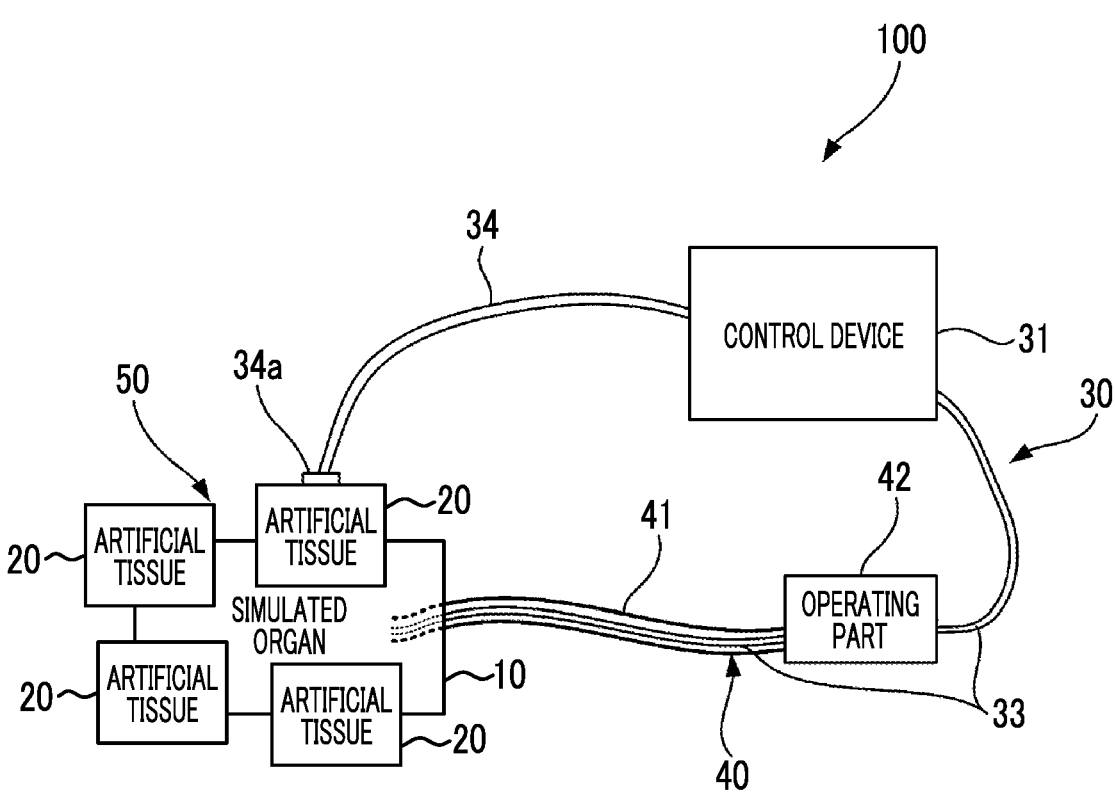
FIG. 1 is a schematic view showing a schematic configuration of a training system 100.

FIG. 1 is a schematic view showing a schematic configuration of the training system 100. The training system 100 comprises a high-frequency current generation device 30, an endoscope 40, and the medical training device 50. The training system 100 performs training of endoscopic submucosal dissection (ESD). The training system 100 can be used for training of a technique in which a current flows through the artificial tissue 20 to perform some treatment on the artificial tissue 20, and the content of the training is not limited to the ESD.

The medical training device 50 comprises a simulated organ 10 and an artificial tissue 20 configured to be attachable to and detachable from the simulated organ 10. One or a plurality of the artificial tissues 20 are configured to be attachable to and detachable from the simulated organ 10. In the example of FIG. 1, four artificial tissues 20 are attachable to and detachable from the simulated organ 10.

The endoscope 40 comprises an insertion part 41 that is inserted into a subject and an operating part 42 for performing various operations. An insertion pipe line into which a treatment tool can be inserted is provided inside the insertion part 41 and the operating part 42. As in a real organ, the insertion part 41 of the endoscope 40 can be inserted into the simulated organ 10.

The high-frequency current generation device 30 comprises a treatment tool 33, a connection cable 34 for performing electrical connection with the artificial tissue 20, and a control device 31 connected to the connection cable 34 and the treatment tool 33. An electrode 34a is provided at a distal end of the connection cable 34, and the electrode 34a is configured to maintain the electrical connection with the artificial tissue 20. The control device 31 controls to supply a high-frequency current to the artificial tissue 20. By a loop configured by the control device 31, the treatment tool 33, the artificial tissue 20 that comes into contact with a distal end of the treatment tool 33, the connection cable 34 electrically connected to the artificial tissue 20, and the control device 31 connected to the connection cable 34, the high-frequency current can be supplied from the control device 31 to the artificial tissue 20.

Figure 2:
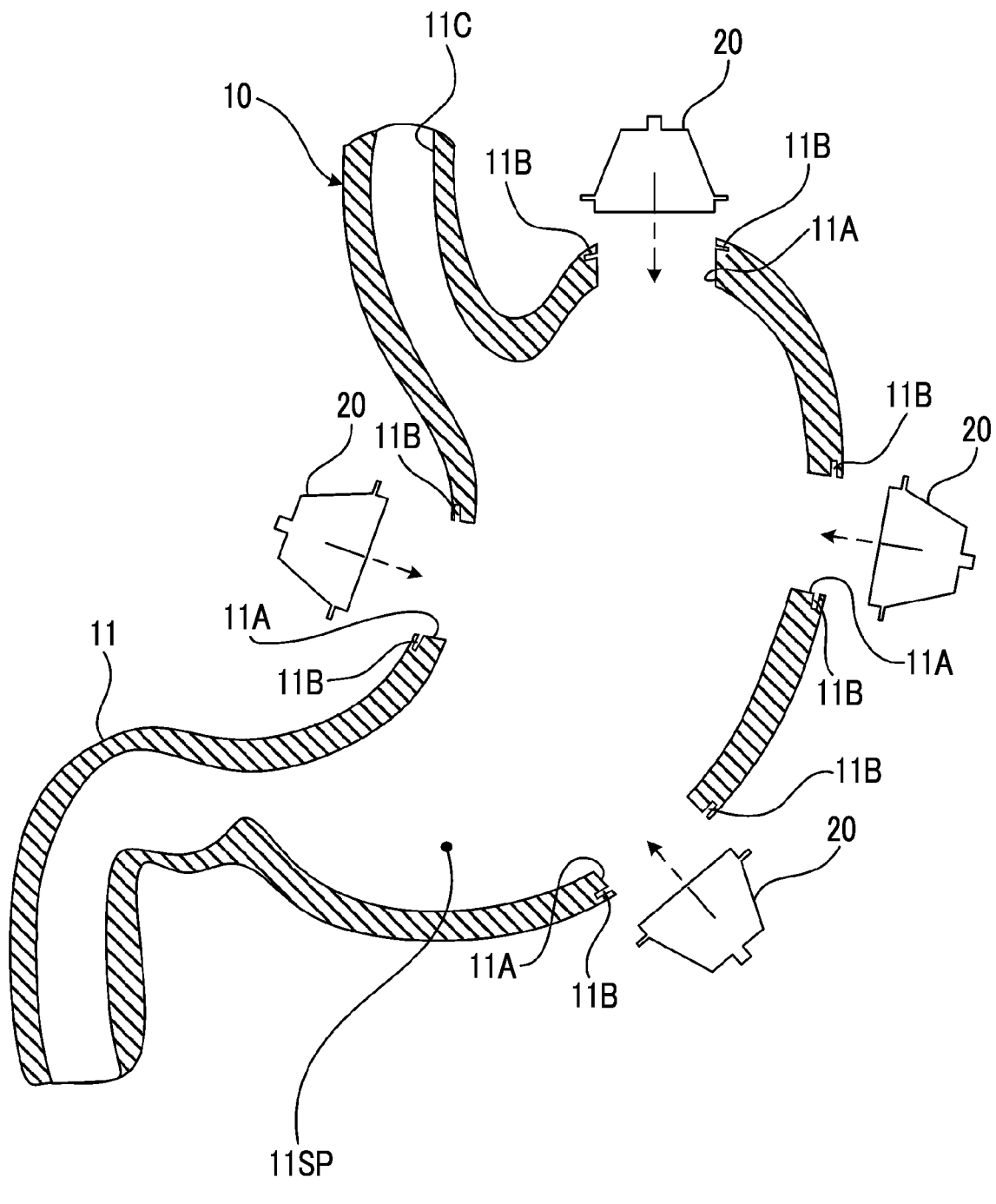
FIG. 2 is a cross-sectional view schematically showing a configuration of a simulated organ 10 shown in FIG. 1.

FIG. 2 is a cross-sectional view schematically showing a configuration of the simulated organ 10 shown in FIG. 1. In the example of FIG. 2, the simulated organ 10 imitates a human stomach. The simulated organ 10 is made of plastic, rubber, a combination thereof, or the like. The simulated organ 10 comprises a body part 11 having a hollow structure imitating the stomach, a plurality of (four in the example of FIG. 2) through-holes 11A provided in the body part 11, and an engagement groove 11B provided on an inner peripheral wall of each through-hole 11A. An opening portion 11C is provided in the body part 11, and the endoscope 40 can be inserted into an inner space 11SP from the opening portion 11C.

The through-hole 11A is provided for inserting the artificial tissue 20 from an outer surface side of the body part 11. The artificial tissue 20 is provided with a flange portion 25D (see FIG. 3), which will be described later, a state in which the artificial tissue 20 is inserted into the through-hole 11A can be easily maintained by engaging the flange portion 25D with the engagement groove 11B provided on the inner peripheral wall of the through-hole 11A.

Figure 3:
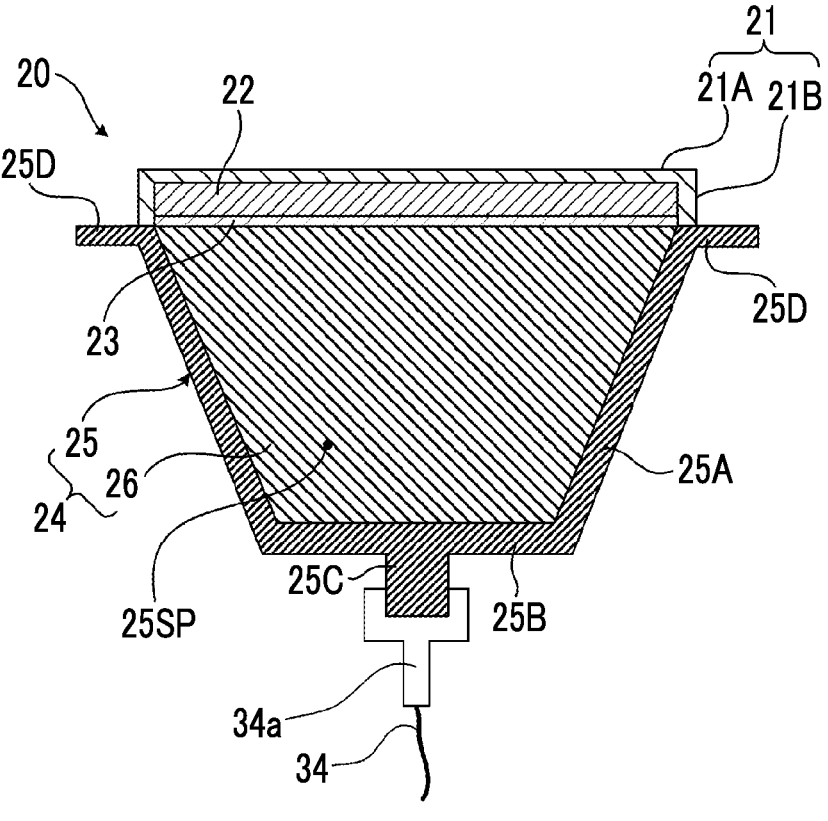
FIG. 3 is a cross-sectional view schematically showing a configuration of an artificial tissue 20 shown in FIG. 1.

FIG. 3 is a cross-sectional view schematically showing a configuration of the artificial tissue 20 shown in FIG. 1. In the present specification, in a state in which the artificial tissue 20 is inserted into the through-hole 11A of the simulated organ 10, a surface of the artificial tissue 20 on a side exposed to the inner space 11SP of the body part 11 (that is, a surface corresponding to the inner surface of the organ) is defined as a front surface of the artificial tissue 20. The artificial tissue 20 preferably has a circular shape in a plan view as viewed from the front surface side, but may have a shape, such as a quadrangular shape or a polygonal shape larger than the quadrangular shape. A size (maximum width) of the artificial tissue 20 in a plan view need only be set to match a disease which is a training target. For example, in the ESD, since a lesion in a range of 30 mm or more and 40 mm or less is appropriate for initial training, it is preferable that the size of the artificial tissue 20 is in a range of 50 mm or more and 60 mm or less.

The artificial tissue 20 comprises a first layer 21 that is provided on the front surface side and is made of a conductive material, a second layer 22 that is made of a conductive material and is provided on a back surface side of the first layer 21, a support layer 24 that supports the first layer 21 and the second layer 22 from a back surface side, and a third layer 23 that is provided between the second layer 22 and the support layer 24, and is made of a conductive material. It is preferable that the artificial tissue 20 is individually packaged with a packaging material, such as plastic, in order to prevent each layer from drying.

The first layer 21 comprises a front surface portion 21A that covers a front surface of the second layer 22 and a side surface portion 21B that covers a side surface of the second layer 22, and has a cup shape. The side surface portion 21B further covers a side surface of the third layer 23 which is an underlayer of the second layer 22. That is, the second layer 22 has a configuration in which an upper surface and the side surface are covered by the first layer 21 and a lower surface is covered by the third layer 23, and the second layer 22 is sealed by the first layer 21 and the third layer 23.

The support layer 24 comprises a first support portion 25 that is made of a conductive material and has a higher rigidity (or hardness) than the first layer 21, the second layer 22, and the third layer 23, and a second support portion 26 that is provided between the first support portion 25 and the third layer 23, is made of a conductive material, and has a lower rigidity (or hardness) than the first support portion 25. It is preferable that the first support portion 25 is made of an alloy, steel use stainless (SUS), or the like.

The first support portion 25 has a bottomed cylindrical shape in which a front surface side of the artificial tissue 20 is open, and the second support portion 26 is accommodated in an accommodation space 25SP inside the first support portion 25 with almost no gap. An inner diameter of the first support portion 25 is reduced from the front surface side to the back surface side of the artificial tissue 20, and includes a side surface portion 25A having an inclined shape. The flange portion 25D is provided on the side surface portion 25A of the first support portion 25 at an end part on the front surface side of the artificial tissue 20. The flange portion 25D is configured to be engaged with the engagement groove 11B of the simulated organ 10 shown in FIG. 2. The first layer 21, the second layer 22, and the third layer 23 are disposed on the outside of the accommodation space 25SP (front surface side with respect to the flange portion 25D). In a state in which the flange portion 25D is engaged with the engagement groove 11B, the first layer 21, the second layer 22, and the third layer 23 are disposed inside the through-hole 11A of the simulated organ 10 and in the inner space 11SP, and a stomach wall can be faithfully reproduced.

A projection 25C that protrudes toward the back surface side of the artificial tissue 20 is provided on an outer surface of a bottom surface portion 25B of the first support portion 25. For example, a clip-shaped electrode 34a provided on the connection cable 34 is attached to the projection 25C. Since the first layer 21, the second layer 22, the third layer 23, and the support layer 24 all have conductivity, the contact between the electrode 34a and the projection 25C causes the electrical connection between the electrode 34a and each layer of the artificial tissue 20.

It is preferable that each of the first layer 21, the second layer 22, the third layer 23, and the second support portion 26 is made of a material containing a hydrogel. A hydrogel material is not particularly limited, and for example, a polymer gel material, such as polyvinyl alcohol, polyethylene glycol, or polyacrylamide, or a natural gel material, such as cellulose, starch, or collagen, can be used. Each of these layers may contain a plurality of types of hydrogels. It should be noted that these gels may be gels in which at least a portion has been modified (for example, the polyvinyl alcohol may be a modified polyvinyl alcohol (anionic-modified polyvinyl alcohol, cationic-modified polyvinyl alcohol, or nonionic-modified polyvinyl alcohol)).

A crosslinked form of the hydrogel may be a non-crosslinked hydrogel, but a crosslinked form {physically crosslinked form (physical gel) or chemically crosslinked form (chemical gel)} is suitable. A specific crosslinking method is not limited, and a well-known method need only be used, including selection of a crosslinking agent.

Each of the first layer 21, the second layer 22, the third layer 23, and the second support portion 26 may contain other additives as appropriate, depending on the intended use. For example, a coloring agent (for example, an agent for performing coloring that imitates the tissue or blood of the human body) may be added to the hydrogel material depending on the intended use. By coloring with the coloring agent, the artificial tissue 20 can have a color close to a color of an organ of a human body (or each layer can be visually distinguished). In addition, other well-known additives (for example, an antioxidant or a viscosity improver) may be added.

Each of the first layer 21, the second layer 22, the third layer 23, and the second support portion 26 may contain a solid filler, such as a filler or fibers (for example, cotton, linen, or hair).

Out of the first layer 21, the second layer 22, the third layer 23, and the second support portion 26, each layer other than the second layer 22 may be a layer made of a soft material other than the hydrogel material. In addition, each layer other than the second layer 22 may be a layer made of the same type of material as the second layer 22 or may be a layer made of a different type of material.

It is preferable that at least the second layer 22 out of the first layer 21, the second layer 22, the third layer 23, and the second support portion 26 is a foam layer. It is preferable that the second layer 22 is a layer having a foam structure obtained by foaming the material containing the hydrogel. As a specific foam structure of the second layer 22, an open cell structure, a closed cell structure, or each of the open cell structure and the closed cell structure may be used. A foam ratio of the second layer 22 is not particularly limited, and can be changed as appropriate depending on the intended use. The second layer 22 need only have the foam structure in a portion used in the surgical procedure (for example, a portion which is a dissection target), and may be, for example, a structure in which the central part is foamed and the other parts are not foamed (structure in which a foam portion and a non-foam portion are continuously present in the layer). It is preferable that the second layer 22 has water absorbency. In a case in which the second layer 22 contains, for example, a water-absorbent polymer or the like, the artificial tissue 20 can be effectively raised in a case in which the swelling agent is injected.

It is preferable that, out of the first layer 21, the second layer 22, the third layer 23, and the second support portion 26, the first layer 21 and the third layer 23, which seal the second layer 22, are each impermeable to water. In other words, it is preferable that the first layer 21 and the third layer 23 are less likely to allow water to pass through than the second layer 22. As a result, in a case in which the swelling agent (such as a physiological saline solution containing a staining solution) is injected into the second layer 22, it is possible to effectively prevent the swelling agent injected into the second layer 22 from leaking out from the space sealed by the first layer 21 and the third layer 23.

In the artificial tissue 20, the first layer 21, the second layer 22, and the third layer 23 imitate a mucous membrane layer, a submucosal layer, and a muscle layer, respectively. Therefore, it is preferable that the third layer 23 has a higher hardness than the first layer 21 and the second layer 22. As a result, for example, the fact that the treatment tool 33 has reached the third layer 23 can be easily recognized by a difference in the hardness between the first layer 21, the second layer 22, and the third layer 23.

It is preferable that the thicknesses of the first layer 21, the second layer 22, and the third layer 23 are each in a range of 0.5 mm or more and 1.5 mm or less in order to make the first layer 21, the second layer 22, and the third layer 23 close to the tissue of the human body.

A training procedure of the ESD with the training system 100 having the configuration described above is as follows. First, the individually packaged artificial tissue 20 is opened, the artificial tissue 20 is attached to any through-hole 11A of the simulated organ 10, and the electrode 34a is attached to the projection 25C of the artificial tissue 20. As a result, the preparation for the training of the ESD is completed.

Next, the endoscope 40 is inserted into the simulated organ 10 to move a distal end of the endoscope 40 to the vicinity of the artificial tissue 20. In this state, the treatment tool 33 is inserted into the endoscope 40, and the swelling agent is injected into the inside of the artificial tissue 20 (second layer 22). Thereafter, the treatment tool 33 is brought into contact with the front surface (first layer 21) of the artificial tissue 20 to supply a high-frequency current to the treatment tool 33, and as a result, a part including the second layer 22 and the first layer 21 raised by the swelling agent is dissected from the artificial tissue 20.

Each time a user performs the training, the training is enabled in a state close to a real treatment environment of the human body only by opening the individual packaging of the artificial tissue 20, attaching the artificial tissue 20 to the through-hole 11A to be trained, and connecting the connection cable 34 to the projection 25C of the artificial tissue 20. After the training is finished, it is only necessary to dispose of the artificial tissue 20 without performing cleaning or the like. As described above, with the training system 100, it is possible to reduce a time required for the preparation or tidying up while reproducing an anatomical environment close to the inside of the human body, and to achieve both a high training effect and convenience.

In a case in which a plane area of the artificial tissue 20 is small, the swelling agent is injected into a wide range of the second layer 22. However, since the side surface of the second layer 22 is covered by the side surface portion 21B of the first layer 21, even in a case in which the plane area is small, the swelling agent is prevented from leaking out from the side surface of the second layer 22. In addition, since the lower surface of the second layer 22 is also covered by the third layer 23, the swelling agent is also prevented from leaking out from the lower surface of the second layer 22. As a result, the medical training using the artificial tissue 20 can be efficiently performed. In addition, since the first layer 21 (further, the third layer 23) enhances the sealing property of the second layer 22, it is possible to suppress a change in the shape (for example, a deformation due to drying or moisture absorption) of the second layer 22 due to the surrounding environment.

In the artificial tissue 20, the first support portion 25 corresponds to a counter electrode (electrode attached to the subject) that is required in a case in which the treatment tool used in the ESD is a monopolar type. Therefore, as compared with a configuration in which the conductor plate is prepared separately from the artificial tissue 20, the preparation for the training or tidying up is facilitated.

In addition, with the artificial tissue 20, the thickness of the support layer 24 is larger than the thickness of the upper layer portion, so that the portability can be enhanced. In addition, the attachment to the simulated organ 10 can also be stably performed.

With the medical training device 50, the artificial tissue 20 can be attached to the simulated organ 10 by engaging the engagement groove 11B with the flange portion 25D. A configuration in which the artificial tissue 20 is fixed to the simulated organ 10 by another unit, such as a rubber band, can also be considered, but as compared with this configuration, the attachment of the artificial tissue 20 can be simplified. In addition, it is not necessary to take measures against loss of the other unit, such as the rubber band, and a manufacturing cost of the medical training device 50 can be reduced. It should be noted that a configuration can also be adopted in which a projection is provided on the body part 11 of the simulated organ 10 and a groove that engages with the projection is provided in the first support portion 25 of the artificial tissue 20.

Next, a modification example of the artificial tissue 20 will be described.

Figure 4:
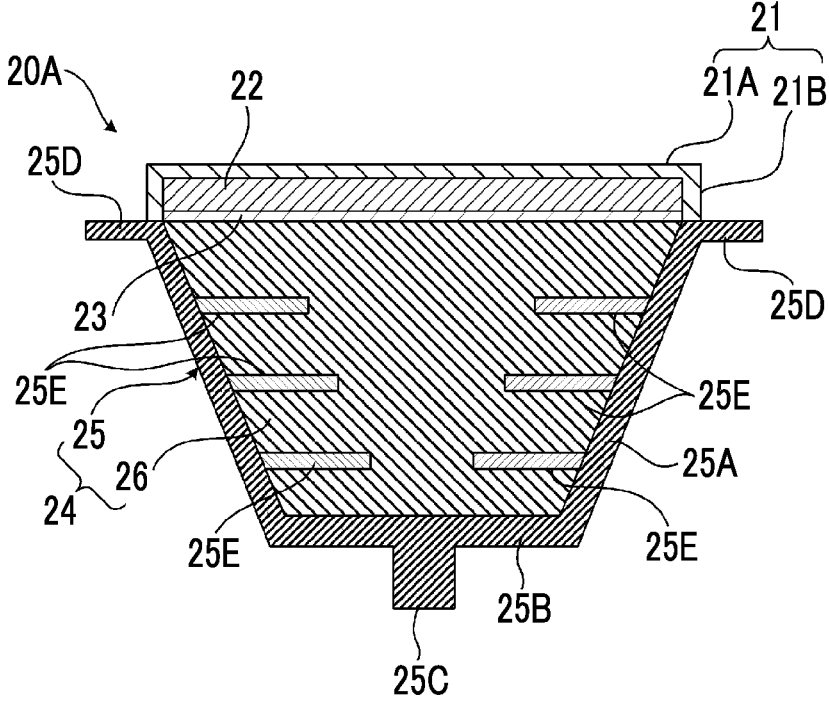
FIG. 4 is a cross-sectional view schematically showing a configuration of an artificial tissue 20A which is a first modification example of the artificial tissue 20.

FIG. 4 is a cross-sectional view schematically showing a configuration of an artificial tissue 20A which is a first modification example of the artificial tissue 20. The artificial tissue 20A has the same configuration as the artificial tissue 20 except that a plurality of (six in the example of FIG. 4) protruding portions 25E that protrude from an inner surface of the side surface portion 25A of the first support portion 25 toward the inside of the second support portion 26 are added. It is not always required that the number of the protruding portions 25E is plural, and may be one.

A shape of the protruding portion 25E is not particularly limited, and for example, an annular plate shape in a plan view, a rod-shaped plate shape in a plan view, or the like can be adopted. It is preferable that a protruding direction of the protruding portion 25E intersects a lamination direction (direction from the front surface to the back surface of the artificial tissue 20) of the first layer 21, the second layer 22, the third layer 23, and the support layer 24. As shown in FIG. 4, it is more preferable that the protruding direction of the protruding portion 25E is orthogonal to the lamination direction.

With the artificial tissue 20A, since the protruding portion 25E of the first support portion 25 and the second support portion 26 come into contact with each other, an increase in a contact surface makes it possible to enhance the adhesive force between the second support portion 26 and the first support portion 25. Therefore, in a case in which the artificial tissue 20A is attached to the simulated organ 10 such that a front surface of the artificial tissue 20A faces to a lower side in a vertical direction, the upper layer with respect to the first support portion 25 (second support portion 26, third layer 23, second layer 22, and the first layer 21) can be prevented from falling off from the first support portion 25. In addition, by increasing the contact area between the first support portion 25 and the second support portion 26, the electrical connection between the first support portion 25 and the second support portion 26 can be made firmly.

Figure 5:
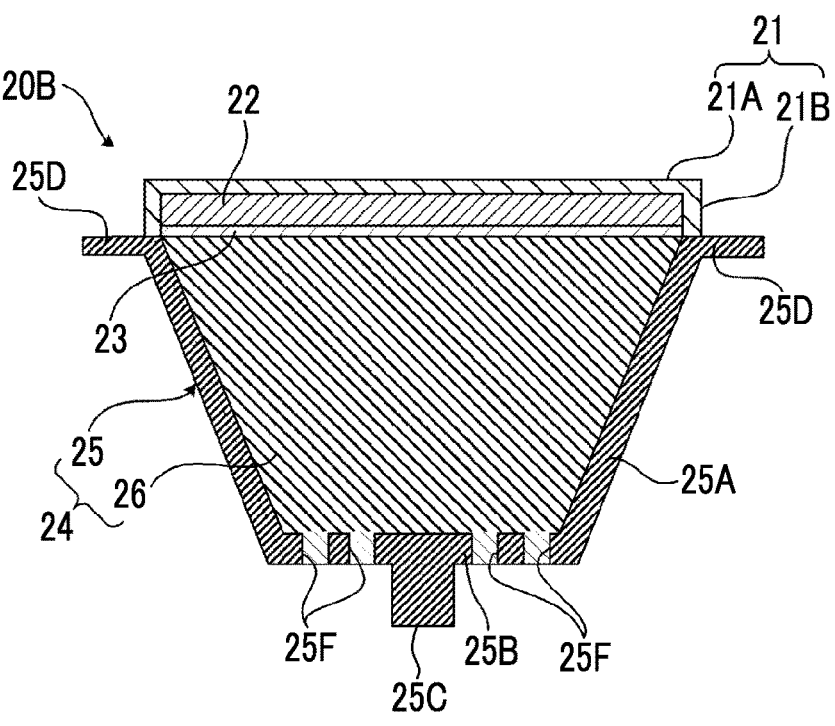
FIG. 5 is a cross-sectional view schematically showing a configuration of an artificial tissue 20B which is a second modification example of the artificial tissue 20.

FIG. 5 is a cross-sectional view schematically showing a configuration of an artificial tissue 20B which is a second modification example of the artificial tissue 20. The artificial tissue 20B has the same configuration as the artificial tissue 20 except that a plurality of (four in the example of FIG. 5) through-holes 25F are added in the bottom surface portion 25B of the first support portion 25. The number of through-holes 25F is not always required to be plural, and may be one. The through-hole 25F of the first support portion 25 is configured to be filled with a portion of the second support portion 26.

With the artificial tissue 20B, by allowing a portion of the second support portion 26 to enter the through-hole 25F of the first support portion 25, it is possible to enhance the adhesive force between the second support portion 26 and the first support portion 25. Therefore, it is possible to prevent the upper layer with respect to the first support portion 25 from falling off from the first support portion 25. The second modification example can be combined with the first modification example. That is, in the artificial tissue 20A shown in FIG. 4, the through-hole may be additionally provided in the bottom surface portion 25B.

Figure 6:
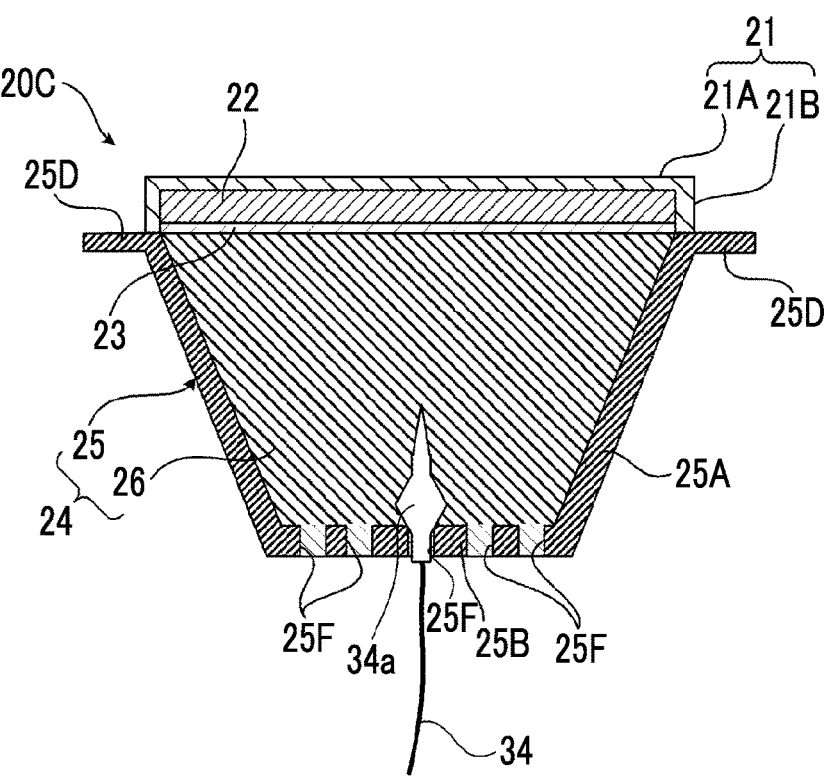
FIG. 6 is a cross-sectional view schematically showing a configuration of an artificial tissue 20C which is a third modification example of the artificial tissue 20.

FIG. 6 is a cross-sectional view schematically showing a configuration of an artificial tissue 20C which is a third modification example of the artificial tissue 20. The artificial tissue 20C has the same configuration as the artificial tissue 20 except that the projection 25C is removed from the bottom surface portion 25B of the first support portion 25 and a plurality of through-holes 25F (five in the example of FIG. 6) are further added. The number of through-holes 25F is not always required to be plural, and may be one. The through-hole 25F of the first support portion 25 is configured to be filled with a portion of the second support portion 26.

In the artificial tissue 20C, in order to perform the electrical connection between the connection cable 34 and the artificial tissue 20, at least one of the plurality of through-holes 25F has a shape that allows the insertion of the electrode 34*a* of the connection cable 34. As shown in FIG. 6, by inserting the electrode 34*a* into the through-hole 25F, the electrode 34*a* enters the inside of the second support portion 26, and as a result, the electrical connection between the electrode 34*a* and each layer of the artificial tissue 20C is performed. In a case in which the artificial tissue 20C is adopted, it is preferable that the shape of the electrode 34*a* is set to a shape having the projection as shown in FIG. 6, and the electrode 34*a* is inserted into the through-hole 25F, and then the electrode 34*a* is rotated, so that the projection is caught with the bottom surface portion 25B to prevent the electrode 34*a* from being easily pulled out.

With the artificial tissue 20C, the same effect as the effect of the artificial tissue 20B can be obtained by the presence of the through-hole 25F. In addition, only by inserting the electrode 34*a* into the through-hole 25F, the electrical connection between the third layer 23, the second layer 22, and the first layer 21, and the electrode 34*a* is enabled via the second support portion 26. Therefore, the preparation for the training can be easily performed.

It should be noted that, in the artificial tissue 20C, it is not always required that the first support portion 25 has conductivity. For example, in the artificial tissue 20C, the first support portion 25 may be made of a non-conductive material, such as resin or rubber. With this configuration, in a case in which the artificial tissue 20C is mounted on the simulated organ 10, a portion through which the current flows is not exposed to the outside of the simulated organ 10. Therefore, the safety during the training can be enhanced.

The third modification example can be combined with the first modification example. That is, in the artificial tissue 20C shown in FIG. 6, the protruding portion may be additionally provided on the inner surface of the side surface portion 25A.

Figure 7:
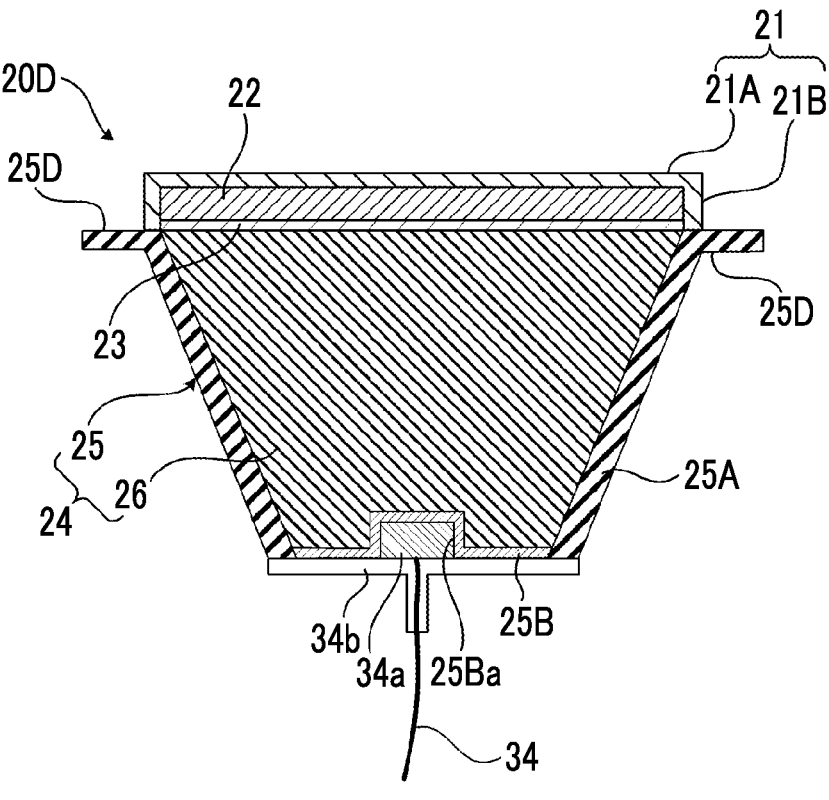
FIG. 7 is a cross-sectional view schematically showing a configuration of an artificial tissue 20D which is a fourth modification example of the artificial tissue 20.

FIG. 7 is a cross-sectional view schematically showing a configuration of an artificial tissue 20D which is a fourth modification example of the artificial tissue 20. The artificial tissue 20D has the same configuration as the artificial tissue 20 except that the side surface portion 25A of the first support portion 25 is made of a non-conductive material, such as plastic or rubber, and the shape of the bottom surface portion 25B of the first support portion 25 is changed. The bottom surface portion 25B of the artificial tissue 20D is made of a conductive material, and a recess portion 25Ba recessed toward the front surface side is provided instead of the projection 25C.

The connection cable 34 shown in FIG. 7 includes a plate-shaped base 34*b* and the electrode 34*a* fixed on the base 34*b*. The electrode 34*a* has a shape corresponding to the recess portion 25Ba. The base 34*b* is made of a non-conductive material, such as plastic or rubber. As shown in FIG. 7, in a state in which the electrode 34*a* is mounted on the recess portion 25Ba and the electrical connection between the electrode 34*a* and the bottom surface portion

25B is performed, the bottom surface portion 25B is completely covered by the base 34*b*.

With the artificial tissue 20D, by mounting the electrode 34*a* on the bottom surface portion 25B, a conductive portion (that is, the bottom surface portion 25B) of the first support portion 25 is not exposed. Therefore, it is possible to prevent a hand from touching a portion of the artificial tissue 20D through which the current flows, and to enhance the safety during the training.

The fourth modification example can be combined with the first modification example. That is, in the artificial tissue 20D shown in FIG. 7, the protruding portion may be additionally provided on the inner surface of the side surface portion 25A.

Figure 8:
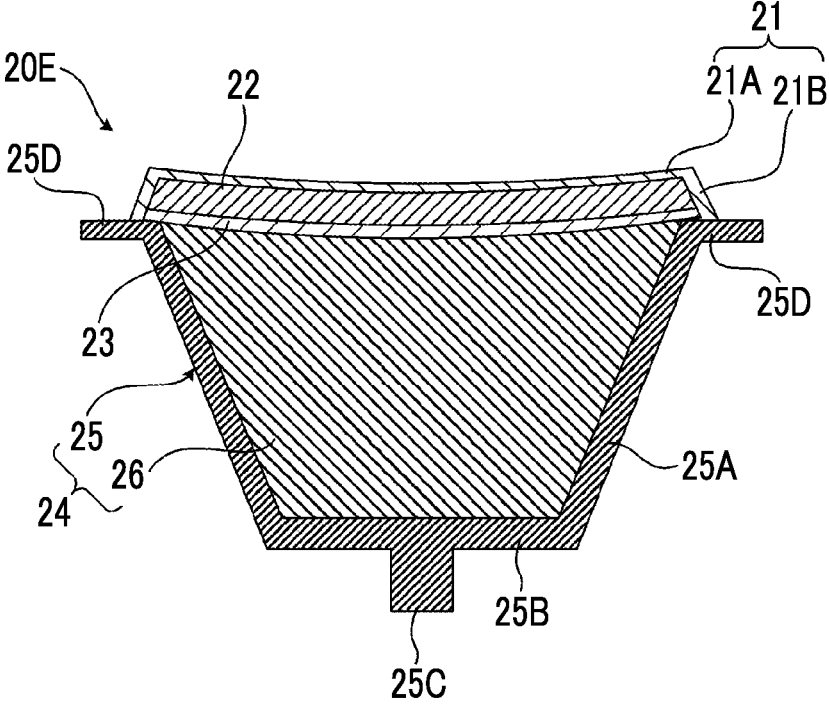
FIG. 8 is a cross-sectional view schematically showing a configuration of an artificial tissue 20E which is a fifth modification example of the artificial tissue 20.

FIG. 8 is a cross-sectional view schematically showing a configuration of an artificial tissue 20E which is a fifth modification example of the artificial tissue 20. The artificial tissue 20E has the same configuration as the artificial tissue 20 except that the first layer 21, the second layer 22, and the third layer 23 are curved in the lamination direction. In the example of FIG. 8, the first layer 21, the second layer 22, and the third layer 23 have a shape curved from the front surface side toward the back surface side. On the contrary, the first layer 21, the second layer 22, and the third layer 23 may have a shape curved from the back surface side toward the front surface side.

With the artificial tissue 20E, a front surface shape of the artificial tissue 20E can be made to be a shape close to the real organ tissue. Therefore, the training of the ESD or the like can be performed in a form closer to the real environment.

The fifth modification example can be combined with any of the first modification example, the second modification example, the third modification example, or the fourth modification example.

Figure 9:
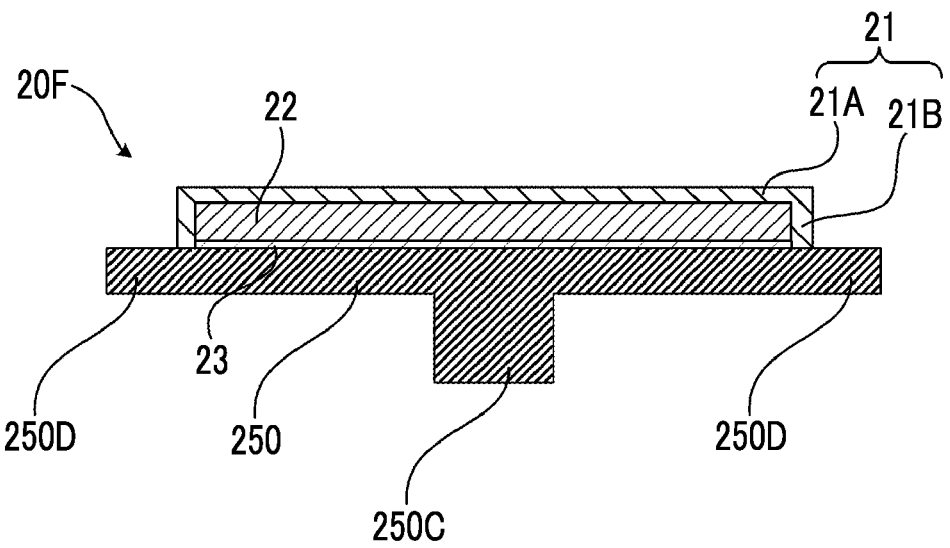
FIG. 9 is a cross-sectional view schematically showing a configuration of an artificial tissue 20F which is a sixth modification example of the artificial tissue 20.

FIG. 9 is a cross-sectional view schematically showing a configuration of an artificial tissue 20F which is a sixth modification example of the artificial tissue 20. The artificial tissue 20F has the same configuration as the artificial tissue 20 except that the support layer 24 is changed to a support portion 250.

A material of the support portion 250 is the same as the material of the first support portion 25 of the artificial tissue 20. The support portion 250 has a flat plate shape, and includes a projection 250C on a back surface side thereof. The electrode 34*a* of the connection cable 34 is attached to the projection 250C. In the artificial tissue 20F, the first layer 21, the second layer 22, and the third layer 23 are laminated on the support portion 250, and the support portion 250 configures the support layer that supports the first layer 21, the second layer 22, and the third layer 23 from the back surface side. The end part 250D of the support portion 250 has a shape that allows the engagement with the engagement groove 11B of the simulated organ 10.

With the artificial tissue 20F, the size reduction as compared with the artificial tissue 20 can be realized. Also, the manufacturing cost can be reduced. The sixth modification example can be combined with the fifth modification example.

Figure 10:
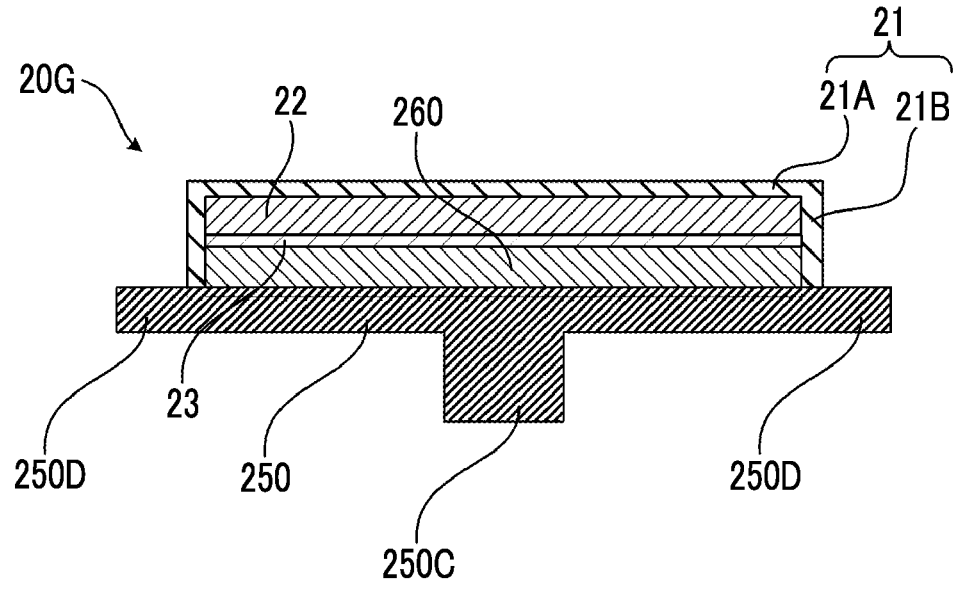
FIG. 10 is a cross-sectional view schematically showing a configuration of an artificial tissue 20G which is a seventh modification example of the artificial tissue 20.

FIG. 10 is a cross-sectional view schematically showing a configuration of an artificial tissue 20G which is a seventh modification example of the artificial tissue 20. The artificial tissue 20G has the same configuration as the artificial tissue 20F of FIG. 9 except that a support portion 260 is added between the third layer 23 and the support portion 250. A material of the support portion 260 is the same as the material of the second support portion 26 of the artificial tissue 20. The support portion 250 and the support portion 260 configure the support layer that supports the first layer 21, the second layer 22, and the third layer 23 from the back surface side. In the artificial tissue 20G, a configuration is adopted in which the side surface portion 21B of the first layer 21 covers a side surface of the support portion 260 in addition to the side surface of the second layer 22 and the side surface of the third layer 23.

The thickness of the upper layer with respect to the support portion 250 can be made larger in the artificial tissue 20G than in the artificial tissue 20F. As a result, a sufficient thickness of a wall portion of the body part 11 of the simulated organ 10 can be ensured, the rigidity of the simulated organ 10 is enhanced, and the training can be stably performed. Also, with in the artificial tissue 20G, even in a case in which the thickness of the upper layer with respect to the support portion 250 is large, since the support portion 260 has conductivity, the electrical connection between the electrode 34a and each layer of the artificial tissue 20G can be performed firmly. In addition, with the artificial tissue 20G, since the side surface portion 21B of the first layer 21 covers the side surface of the support portion 260, it is possible to more firmly prevent the swelling agent, which is injected into the second layer 22, from leaking out to the outside.

The seventh modification example can be combined with any of the first modification example, the second modification example, the third modification example, the fourth modification example, or the fifth modification example.

Figures 11, 12:
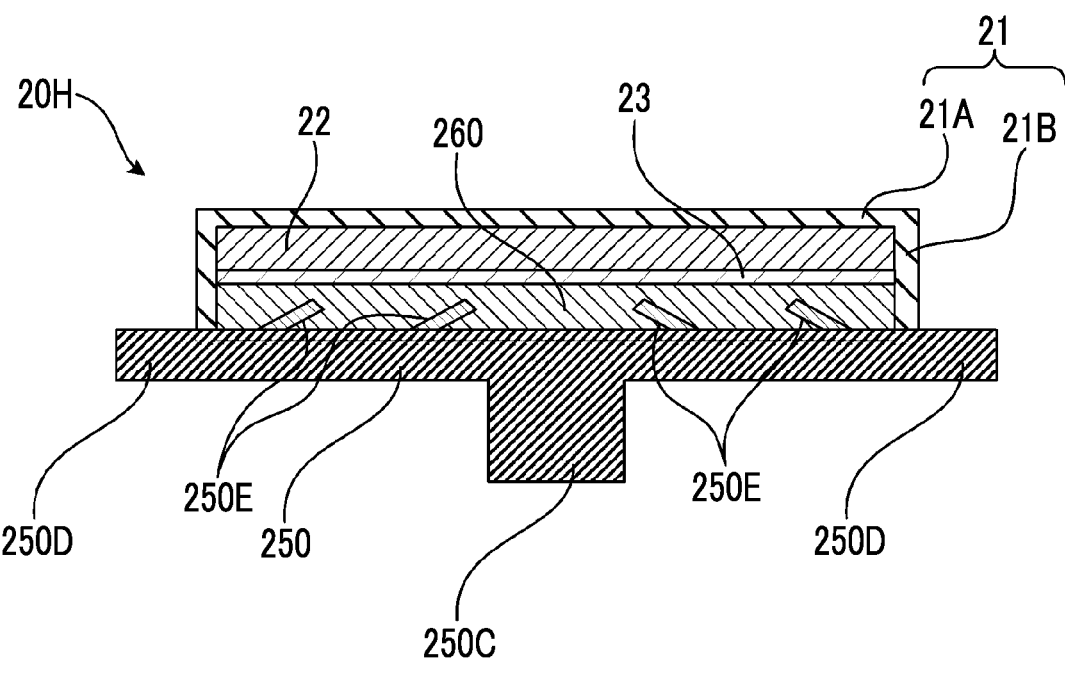
FIG. 11 is a cross-sectional view schematically showing a configuration of an artificial tissue 20H which is an eighth modification example of the artificial tissue 20.
FIG. 12 is a cross-sectional view schematically showing a configuration of an artificial tissue 20X.

FIG. 11 is a cross-sectional view schematically showing a configuration of an artificial tissue 20H which is an eighth modification example of the artificial tissue 20. The artificial tissue 20H has the same configuration as the artificial tissue 20G of FIG. 10 except that a protruding portion 250E that protrudes toward the inside of the support portion 260 is additionally provided on a front surface of the support portion 250. The protruding portion 250E protrudes in the direction intersecting the lamination direction of the first layer 21, the second layer 22, and the third layer 23.

With the artificial tissue 20H, since the protruding portion 250E of the support portion 250 and the support portion 260 come into contact with each other, the contact surface makes it possible to enhance the adhesive force between the support portion 260 and the support portion 250. Therefore, in a case in which the artificial tissue 20H is attached to the simulated organ 10 such that a front surface of the artificial tissue 20H faces to the lower side in the vertical direction, it is possible to prevent the upper layer with respect to the support portion 250 from falling off from the support portion 250. In addition, by increasing the contact area between the support portion 250 and the support portion 260, the electrical connection between the support portion 250 and the support portion 260 can be made firmly.

The eighth modification example can be combined with any of the second modification example, the third modification example, the fourth modification example, or the fifth modification example.

It should be noted that, in each configuration example of the artificial tissue described so far, the third layer 23 is not always required and can be omitted. In addition, in the artificial tissues 20, 20A, 20B, 20C, 20D, and 20E, a configuration may be adopted in which the first layer 21, the second layer 22, and the third layer 23 are accommodated inside the first support portion 25.

FIG. 12 is a cross-sectional view schematically showing a configuration of an artificial tissue 20X as a reference. The artificial tissue 20X has a configuration in which the first layer 21 is substituted with a first layer 21X in the artificial tissue 20 shown in FIG. 3. The first layer 21X has a configuration that covers the front surface of the second layer 22 and does not cover the side surface of the second layer 22. In the artificial tissue 20X, there is a possibility that the swelling agent injected into the second layer 22 leaks out to the outside from the side surface of the second layer 22. On the other hand, with the artificial tissue 20 and the modification example thereof, it is possible to prevent the swelling agent from leaking out, as described above.

Figure 13:
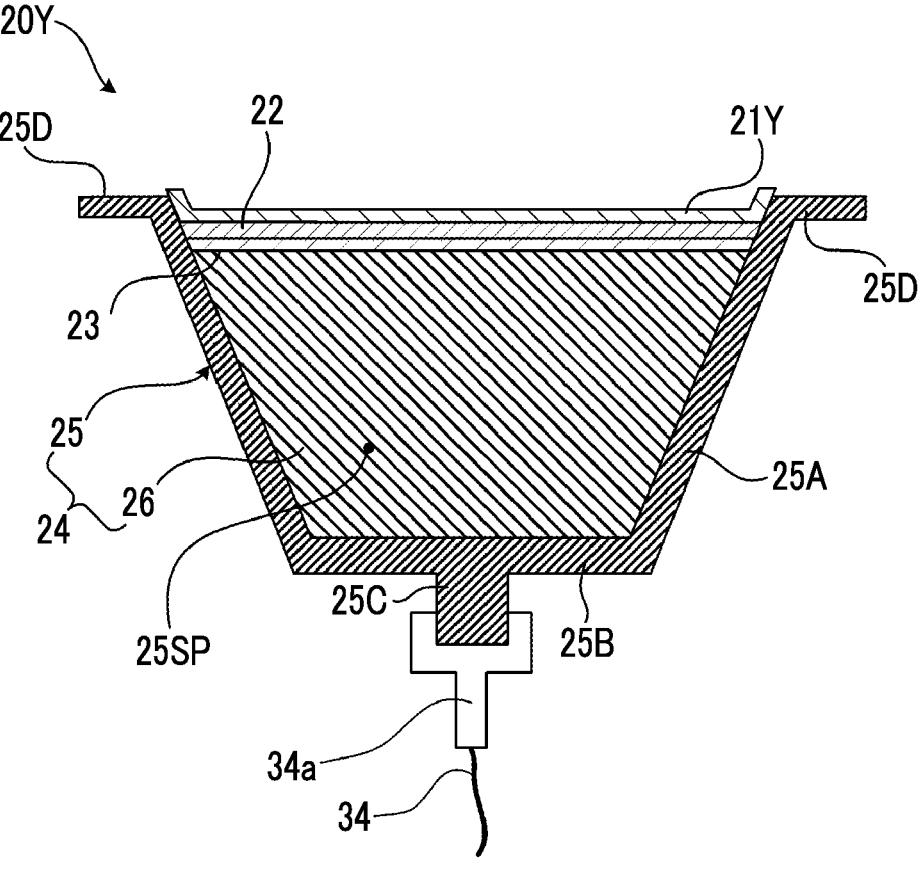
FIG. 13 is a cross-sectional view schematically showing a configuration of an artificial tissue 20Y.

FIG. 13 is a cross-sectional view schematically showing a configuration of an artificial tissue 20Y as a reference. The artificial tissue 20Y shown in FIG. 3 has a configuration in which, in the artificial tissue 20, the second layer 22 and the third layer 23 are disposed inside the first support portion 25 and the front surface of the second layer 22 is covered by a first layer 21Y. In the artificial tissue 20Y, since the second layer 22 is accommodated in the first support portion 25, an effect of suppressing leaking out of the swelling agent can be expected. However, since the front surface of the artificial tissue 20Y is recessed toward the back surface side, a difference in the structure from the real organ is large in a case in which the artificial tissue 20Y is attached to the simulated organ 10. As a result, it is difficult to perform the training in a state close to the real environment. In a configuration in which the second layer 22 is located outside the first support portion 25 as in the artificial tissue 20 and the modification examples thereof, the structure of the simulated organ 10 on which the artificial tissue is mounted can be made close to the real organ, and the training effect can be enhanced.

As described so far, at least the following matters are described in the present specification. It should be noted that the components and the like corresponding to the components in the embodiment described above are shown in parentheses, but the present invention is not limited to this.
(1)

An artificial tissue (artificial tissue 20, 20A to 20H) comprising a first layer (first layer 21) that is made of a conductive material and is provided on a front surface side of the artificial tissue, the first layer having a front surface portion (front surface portion 21A) and a side surface portion (side surface portion 21B), a second layer (second layer 22) that is made of a conductive material and is provided on a back surface side of the first layer, the second layer having a side surface and a side surface, and a support layer (support layer 24 and support portion 250, or support portion 250 and support portion 260) that supports the first layer and the second layer from a back surface side of the artificial tissue, in which the front surface portion of the first layer covers the front surface of the second layer, and the side surface portion of the first layer covers the side surface of the second layer.

According to (1), since the side surface of the second layer is covered by the side surface portion of the first layer, even in a case in which the plane area of the artificial tissue is small, and the swelling agent is injected into most of the second layer, it is possible to prevent the swelling agent from leaking out from the side surface of the second layer. Therefore, the medical training using the artificial tissue can be efficiently performed in an environment close to reality. In addition, by increasing the sealing property of the second layer, it is possible to suppress the change in the shape of the second layer due to the surrounding environment.

(2)

The artificial tissue according to (1), in which the support layer is configured such that the second layer is electrically connectable with an external electrode (electrode 34a).

According to (2), since the electrical connection between the second layer and the external electrode is enabled via the support layer, the high-frequency current can flow through the artificial tissue from the first layer side, and the training of the endoscopic submucosal dissection or the like can be performed. Since the training of the endoscopic submucosal dissection or the like can be performed without preparing the conductor plate or the like separately from the artificial tissue, the training can be efficiently performed.

(3)

The artificial tissue according to (1) or (2), in which the support layer includes a first support portion (first support portion 25 and support portion 250) that has at least a portion (bottom surface portion 25B) made of a conductive material and has a higher rigidity than the first layer and the second layer.

According to (3), since the electrical connection between the second layer and the external electrode is enabled via the support layer, the high-frequency current can flow through the artificial tissue from the first layer side, and the training of the endoscopic submucosal dissection or the like can be performed. Since the training of the endoscopic submucosal dissection or the like can be performed without preparing the conductor plate or the like separately from the artificial tissue, the training can be efficiently performed.

(4)

The artificial tissue according to (3), in which the support layer includes a second support portion (second support portion 26 and support portion 260) that is provided between the first support portion and the second layer, is made of a conductive material, and has a lower rigidity than the first support portion.

According to (4), even in a case in which the artificial tissue has a certain thickness, the electrical connection between the second layer and the external electrode can be made more firmly. By forming the artificial tissue having a certain thickness, in a case in which the artificial tissue is attached to, for example, the simulated organ, the attachment thereof can be facilitated.

(5)

The artificial tissue according to (4), in which the side surface portion of the first layer further covers a side surface of the second support portion.

According to (5), it is possible to more firmly prevent the swelling agent, which is injected into the second layer, from leaking out to the outside. In addition, by further increasing the sealing property of the second layer, it is possible to further suppress the change in the shape of the second layer due to the surrounding environment.

(6)

The artificial tissue according to (4) or (5), in which the first support portion includes a through-hole (through-hole 25F).

According to (6), for example, by allowing a portion of the second support portion to enter the through-hole of the first support portion, it is possible to enhance the adhesive force between the second support portion and the first support portion. Therefore, it is possible to prevent the upper layer with respect to the first support portion from falling off from the first support portion, and to enhance the durability of the artificial tissue.

(7)

The artificial tissue according to (6), in which the through-hole is configured such that the external electrode (electrode 34a) is insertable into the through-hole.

According to (7), in a case in which the electrode is simply inserted into the through-hole of the first support portion, the electrical connection between the second layer, the first layer, and the electrode is enabled via the second support portion. Therefore, it is possible to easily perform the preparation for the training of the endoscopic submucosal dissection or the like.

(8)

The artificial tissue according to any one of (1) to (7), further comprising a third layer (third layer 23) that is provided between the second layer and the support layer, and is made of a conductive material.

According to (8), it is possible to perform the training of the endoscopic submucosal dissection or the like in a form closer to the real environment.

(9)

The artificial tissue according to (8), in which the third layer has a side surface; and the side surface portion of the first layer further covers the side surface of the third layer.

According to (9), it is possible to more firmly prevent the swelling agent, which is injected into the second layer, from leaking out to the outside. In addition, by further increasing the sealing property of the second layer, it is possible to further suppress the change in the shape of the second layer due to the surrounding environment.

(10)

The artificial tissue according to (8), in which the first layer, the second layer, and the third layer have a shape curved in a lamination direction of the first layer, the second layer, and the third layer.

According to (10), the front surface shape of the artificial tissue can be made to be the shape close to the real organ tissue, and the training of the endoscopic submucosal dissection or the like can be performed in a form closer to the real environment.

(11)

The artificial tissue according to any one of (4) to (7), in which the first support portion includes a protruding portion (protruding portions 25E and 250E) that protrudes into the second support portion.

According to (11), the contact surface between the protruding portion of the first support portion and the second support portion makes it possible to enhance the adhesive force between the second support portion and the first support portion. Therefore, it is possible to prevent the upper layer with respect to the first support portion from falling off from the first support portion, and to enhance the durability of the artificial tissue. In addition, by increasing the contact area between the first support portion and the second support portion, the electrical connection between the first support portion and the second support portion can be made firmly.

(12)

The artificial tissue according to (11), in which the protruding portion protrudes in a direction intersecting a lamination direction of the first layer, the second layer, and the support layer.

According to (12), in a case in which the artificial tissue is disposed such that the first support portion is on the upper side in the vertical direction with respect to the second support portion, due to the contact between the protruding portion of the first support portion and the second support portion, it is possible to prevent the second support portion from falling off to the lower side in the vertical direction.

(13)

The artificial tissue according to any one of (4) to (7), (11), or (12), in which the first support portion (first support portion 25) has a bottomed cylindrical shape having an accommodation space (accommodation space 25SP), and the second support portion (second support portion 26) is provided in the accommodation space.

According to (13), since the first support portion is formed in the bottomed cylindrical shape, the artificial tissue can be easily carried. In addition, even in a case in which the artificial tissue is attached to the simulated organ, the attachment can be stably performed.

(14)

The artificial tissue according to (13), in which the first layer and the second layer are provided to protrude to an outside of the accommodation space.

According to (14), in a case in which the artificial tissue is attached to the simulated organ, a curved shape of an inner surface of the simulated organ and the front surface shape of the artificial tissue can be matched, and the training using the simulated organ can be performed in a form closer to the real environment.

(15)

The artificial tissue according to (13) or (14), in which the first support portion includes a side surface portion (side surface portion 25A) that is made of a non-conductive material, and a bottom surface portion (bottom surface portion 25B) that is made of a conductive material and on which the external electrode (electrode 34a) is mountable, and the bottom surface portion is not exposed in a state in which the electrode is mounted on the bottom surface portion.

According to (15), by mounting the electrode on the bottom surface portion of the first support portion, the conductive portion of the first support portion is not exposed, so that the hand can be prevented from touching the portion of the artificial tissue through which the current flows, and the safety during the training can be enhanced.

(16)

A medical training device (medical training device 50) comprising the artificial tissue according to any one of (1) to (15), and a simulated organ (simulated organ 10) which the artificial tissue is attachable to and detachable from.

According to (16), by attaching the artificial tissue to the simulated organ and inserting, for example, the endoscope into the simulated organ, the training of the technique using the endoscope is enabled.

EXPLANATION OF REFERENCES

10: simulated organ
11A, 25F: through-hole
11: body part
11B: engagement groove
11C: opening portion
11SP: inner space
20X, 20Y: artificial tissue
20A, 20B, 20C, 20D, 20E, 20F, 20G, 20H, 20: artificial tissue
21A: front surface portion
21B, 25A: side surface portion
21, 21X, 21Y: first layer
22: second layer
23: third layer
24: support layer
25: first support portion
25B: bottom surface portion 25C, 250C: projection
25D: flange portion
25E, 250E: protruding portion
25SP: accommodation space
25Ba: recess portion
26: second support portion
30: high-frequency current generation device
31: control device
33: treatment tool
34a: electrode
34b: base
34: connection cable
40: endoscope
41: insertion part
42: operating part
50: medical training device
100: training system
250D: end part
250, 260: support portion

What is claimed is:

1. An artificial tissue comprising:
a first layer that is made of a conductive material and is provided on a front surface side of the artificial tissue, the first layer having a front surface portion and a side surface portion;
a second layer that is made of a conductive material and is provided on a back surface side of the first layer, the second layer having a front surface and a side surface;
a support layer that supports the first layer and the second layer from a back surface side of the artificial tissue; and
a third layer that is provided between the second layer and the support layer, and is made of a conductive material, wherein the front surface portion of the first layer covers the front surface of the second layer, and the side surface portion of the first layer covers the side surface of the second layer.

2. The artificial tissue according to claim 1, wherein the support layer is configured such that the second layer is electrically connectable with an external electrode.

3. The artificial tissue according to claim 2, wherein the support layer includes a first support portion that has at least a portion made of a conductive material and has a higher rigidity than the first layer and the second layer.

4. The artificial tissue according to claim 3, wherein the support layer includes a second support portion that is provided between the first support portion and the second layer, is made of a conductive material, and has a lower rigidity than the first support portion.

5. The artificial tissue according to claim 4, wherein the side surface portion of the first layer further covers a side surface of the second support portion.

6. The artificial tissue according to claim 4, wherein the first support portion includes a through-hole.

7. The artificial tissue according to claim 6, wherein the through-hole is configured such that the external electrode is insertable into the through-hole.

8. The artificial tissue according to claim 1, wherein the third layer has a side surface; and the side surface portion of the first layer further covers the side surface of the third layer.

9. The artificial tissue according to claim 1,
wherein the first layer, the second layer, and the third layer have a shape curved in a lamination direction of the first layer, the second layer, and the third layer.

10. The artificial tissue according to claim 4,
wherein the first support portion includes a protruding portion that protrudes into the second support portion.

11. The artificial tissue according to claim 10,
wherein the protruding portion protrudes in a direction intersecting a lamination direction of the first layer, the second layer, and the support layer.

12. The artificial tissue according to claim 4,
wherein the first support portion has a bottomed cylindrical shape having an accommodation space, and
the second support portion is provided in the accommodation space.

13. The artificial tissue according to claim 12,
wherein the first layer and the second layer are provided to protrude to an outside of the accommodation space.

14. The artificial tissue according to claim 12,
wherein the first support portion includes a side surface portion that is made of a non-conductive material, and a bottom surface portion that is made of a conductive material and on which the external electrode is mountable, and
the bottom surface portion is not exposed in a state in which the external electrode is mounted on the bottom surface portion.

15. A medical training device comprising:
the artificial tissue according to claim 1; and
a simulated organ which the artificial tissue is attachable to and detachable from.

* * * * *